United States Patent [19]

Finn

[11] Patent Number: 4,540,632

[45] Date of Patent: Sep. 10, 1985

[54] COATING COMPOSITION FOR ELASTOMERIC PACKAGING COMPONENTS

[75] Inventor: George A. Finn, Chadds Ford, Pa.

[73] Assignee: The West Company, Phoenixville, Pa.

[21] Appl. No.: 581,179

[22] Filed: Feb. 17, 1984

[51] Int. Cl.³ .................. B22B 27/00; C08K 5/02; C08L 27/18; C08L 33/10
[52] U.S. Cl. .................................... 428/422; 428/421; 524/463
[58] Field of Search ................. 524/463; 428/421, 422

[56] References Cited

U.S. PATENT DOCUMENTS

| | | | |
|---|---|---|---|
| 4,316,941 | 2/1982 | Eguchi et al. | 428/422 |
| 4,321,306 | 3/1982 | Eguchi | 428/421 |
| 4,335,228 | 6/1982 | Moore et al. | 428/421 |
| 4,343,861 | 8/1982 | Stivers | 428/421 |
| 4,393,119 | 7/1983 | Concannon | 428/421 |

*Primary Examiner*—Allan M. Lieberman
*Attorney, Agent, or Firm*—Eugene E. Renz, Jr.

[57] ABSTRACT

A coating composition for an elastomeric substrate used in packaging comprising polytetrafluoroethylene and poly n-butyl acrylate in a solvent comprising a blend of a 1,1-trichlorethane and 1,1,2-trichloro-2,2-trafluoroethane, and the coated elastomeric substrate.

2 Claims, No Drawings

COATING COMPOSITION FOR ELASTOMERIC PACKAGING COMPONENTS

BACKGROUND OF THE INVENTION

Elastomeric articles are widely employed in the closure art and particularly for elastomeric packaging components. Such articles are especially useful for sealing vials or other containers, usually of glass, for use in packaging medicaments, and for plungers in hypodermic syringes, and the like. Such articles are commonly composed of rubber which is, of course, normally compounded with vulcanization accelerators, vulcanizing agents, sulfur, carbon black, zinc oxide, titanium dioxide, and other pigments, and a wide diversity of other ingredients which are inimical to medicaments. Such foreign materials inevitably leach out or otherwise contaminate the medicaments, or even react with them to produce unwanted or even toxic materials. It has been customary, therefore, to take measures to prevent contact between the rubber and the medicament. This has previously been done by interposing a barrier of an inert plastic such as polypropylene, polytetrafluoroethylene or the like. Such a physical barrier layer has been composed of an inert plastic in the form of a separate element of the closure, or has been formed by laminating a film of an inert plastic over the rubber stopper, or other packaging component.

Another problem common to such packaging, particularly for use in the medical field, has been that the rubber stoppers or other packaging components have a high coefficient of friction which makes it difficult to eliminate foreign matter on the surface of the articles. Moreover, some sort of lubricant or closure coating is needed to reduce the coefficient of friction of the components to enhance the physical characteristics of the closures to facilitate handling and sealing of the containers by automatic filling and sealing equipment. Closure coatings to overcome these problems have typically been based upon silicone resins. Such coatings, while still widely employed, are now considered undesirable since they tend to migrate into the packaged solution, for example, in the form of globules and it is not known what the long term effects are of silicones in the body. Indeed, the use of silicones for these purposes may be banned in a few years.

Therefore, there has been a clear need in the art for a coating for rubber closures which minimizes or totally eliminates the need for silicone lubricants in the assembly, closure and sealing of elastomeric packaging components, and which is also capable of preventing contamination of packaged medicaments by foreign matter on the surface of the packaging components, such as stoppers or the like.

PRIOR ART

One attempt to supply this need in the art is Eguchi, U.S. Pat. No. 4,321,306, issued Mar. 23, 1982, which describes rubber stoppers for tight sealing in which contamination by foreign matter on the surface of the rubber stopper is prevented by the use of a vulcanized film of propylenetetrafluoroethylene-glycidyl vinyl ether copolymer rubber coated wholly or partially onto the surface of the rubber stopper. This coating is said to be capable of vulcanization by heating without the use of an added vulcanizing agent to provide a protective film of good adhesiveness and good sliding characteristics to aid in handling and sealing. While this method is directed to the problems in the art concerning the use of rubber stoppers without a silicone lubricant, it has the disadvantage that it requires vulcanization of the coating at high temperatures.

In view of the foregoing it is apparent that a need remains in the art for a simple, economical, non-toxic coating for rubber stoppers and the like which will not only preclude contamination of the contents of a container by foreign matter on the surface of the rubber, and which also reduces the coefficient of friction of the rubber to facilitate insertion and sealing of the coated stoppers in glass or other containers.

It is a primary object of the present invention, therefore, to provide a novel, inexpensive and easily applied coating composition for rubber stoppers which will prevent contamination of the contents of containers sealed therewith by foreign matter on the surface of the rubber.

It is another object of the invention to provide such a coating composition which also reduces the coefficient of friction of rubber articles coated therewith to facilitate their handling and insertion in glass bottles or other containers to seal the same.

It is still another object of the invention to provide such a coating composition which is simple and economical to apply and which does not require the use of high temperatures for vulcanization.

SUMMARY OF THE INVENTION

The foregoing and other objects of the present invention, which will become apparent below, are achieved by the provision of a novel coating composition which is easily applied to rubber or other elastomeric articles and simply dried to achieve coated rubber articles which will not contaminate the contents of a container and which also reduces the coefficient of friction of the rubber to provide articles having a desirably low-friction surface to facilitate their insertion in a complementary packaging element, such as a bottle, vial or syringe, preferably of glass, while minimizing or eliminating the need for a silicone lubricant.

The novel coating composition of the invention comprises about 1.5 to about 6% polytetrafluorethylene as the inert plastic dispersed in a film of poly n-butyl methacrylate which seals packaging elements such as rubber stoppers, syringe plungers or the like, to prevent release of foreign matter from the surface of the rubber or other elastomer. These two components are dissolved in a solvent comprising about 68 to about 92% 1,1,1-trichloroethane (stabilized) and about 6 to about 24% 1,1,2-trichloro-2,2,1-trifluorethane to obtain a coating solution. All percentages herein are by weight of the total composition. This solution has a specific gravity of about 1.2 to about 1.4.

The novel coating composition is prepared by simply mixing the ingredients according to conventional techniques to obtain a homogeneous solution for application to the substrate packaging components.

The substrate elastomeric packaging components may take any form known to the art and may be composed of any elastomeric material suitable for use in such components. As those skilled in the art are aware, suitable elastomers include butyl rubber, chlorinated and brominated butyl rubber, and ethylenepropylenediene (EPDM) rubbers, among others known to the art. As is known in the art, natural rubber is generally undesirable for use in closures of this type.

Athough a primary purpose of the new coating compositions is to encapsulate any foreign matter on the surface of the rubber or other elastomeric packaging components to preclude contact with the packaged product such as a medicament, it is, nevertheless, highly desirable that the presence of such potential contaminants on the surface of the articles to be treated should be minimized before coating. It is desirable, therefore, that this fact be taken into account even during the molding or other formation of the substrate articles or packaging components. Therefore, the molds or other forming apparatus should be clean and any mold release component or other materials employed in the formation of these substrate articles should be selected with the view that they should be innocuous and easily removed prior to application of the coating according to the invention.

The formed substrate articles are washed or otherwise treated to remove and minimize residual foreign matter on the surface of the articles. This is suitably accomplished by washing the articles in hot or boiling deionized water, adjusting the pH as desired or necessary, and continuing the washing with suitable agitation for sufficient time to achieve the desired result, e.g. from about 5 to about 60 minutes, or more.

The coating is then applied to the washed articles by spraying or in any other suitable manner which leaves sufficient coating solution on the articles. The articles are then dried to obtain the desired coated rubber.

The coating composition is applied in an amount to provide, on drying, sufficient dried coating to accomplish the purposes of the invention, i.e. to prevent contamination of the contents of a container by foreign matter on the surface of the article before coating, and to reduce the coefficient of friction of the packaging components to facilitate the insertion and sealing thereof in the finished package. A suitable coverage is about 65 to 75 ml of coating solution per 784 in$^2$ of substrate, i.e. about 0.08 to about 0.10 ml/in$^2$. The sealed packages may then be sterilized, if desired, by any conventional technique such as by steam, ethylene oxide or gamma radiation, or the like, depending upon the nature of the package and its contents.

Rubber packaging components made in this way are highly useful in a variety of packaging applications, and particularly medical packaging. They also have excellent shelf life and may be capable of withstanding hot or even boiling water for prolonged periods of time such as 30-60 minutes or more without peeling of the protective and lubricating coating. Such articles not only preclude contamination of the packaged materials but are easily inserted and sealed in complementary packaging components with the use of minimal amounts of a silicone lubricant or, indeed, in many cases without the use of any such lubricant.

DETAILED DESCRIPTION OF THE INVENTION

In order to achieve the best results in accordance with the invention, it is desirable to control all aspects of the production of the elastomeric packaging components, including the molding of the same, the selection of the mold release agents and any other material, including the mold coming in contact with the same and the washing and drying procedure. A preferred method for accomplishing this result is illustrated in the following example.

EXAMPLE

A suitable rubber formulation obtained by compounding and vulcanizing butyl rubber was compression molded in a suitable mold to form a stopper for medical bottles or vials. The steel mold was first cleaned in a conventional manner and coated with an aqueous, commercially available mold release agent.

The rubber composition is then molded according to conventional procedures under conditions suitable for the particular composition. The substrate articles are then removed from the mold as panels of uncoated stoppers.

The panels are then washed by immersion in an agitated solution of deionzed water and an alkaline detergent having a pH of at least about 10, and preferably about 11 to 14. The wash solution is heated to a temperature of at least about 200° F., and preferably to boiling. Washing is continued for about 30 minutes, as necessary, and the panels are removed and placed in an agitated water bath for about 30 minutes at the same temperature. The washed panels are then dried in a suitable forced air drying chamber for a period of 4-5 minutes at a temperature of about 260° F.

The dried panels are then treated with the coating of the invention, described above. The coating operation should be carried out no more than about 8 hours after washing and drying in order to minimize the exudation of contaminates from the rubber or contamination by dust, or the contaminants in the environment.

The non-aqueous coating solution comprising polytetrafluoroethylene and poly n-butyl methacrylate is applied in any suitable manner, as by spraying. Conventional automatic spray guns may be employed. Inasmuch as the 1,1,1-trichloroethane and 1,1,2-trichloro-2,2,-trifluoroethane solvents are highly volatile, the panels of coated rubber packaging elements dry in air at ambient temperature in about one minute or less. The dried panels are then sprayed on the opposite side and dried as before.

The coated articles are then removed from the panels, trimmed, washed and packed by conventional procedures.

Coated elastomeric packaging elements formed in this way have sufficient residual dry coating of the polytetrafluoroethylene dispersed in a film of poly n-butyl methacrylate binder to inhibit the exudation of contaminants from the surface of the rubber substrates and also to inhibit the articles from picking up contaminants from the environment, since such contaminants do not readily adhere to the surfaces of the coated articles. Moreover, any environmental contaminants which are picked up do not adhere strongly and are readily removed by washing or otherwise.

The coated articles are also easily processed in automatic machinery for insertion and sealing of containers due to their excellent surface characteristics, such as low coefficient of friction and low insertion force into glass containers, for example. Therefore, closures are provided which have excellent processing capabilities making it possible to markedly reduce or even totally eliminate the use of silicone lubricants. The level of silicone lubricants, if any, required will, of course, depend to some degree on the particular processing equipment and packaging application involved.

In any event, the coating composition of the present invention markedly reduces or eliminates the need for silicone lubricants to aid in the insertion and sealing of rubber closures in glass bottles and effectively prevent contamination of the packaged contents by the rubber closures.

What is claimed is:

1. A solution for coating an elastomeric article to facilitate the insertion and sealing thereof in a complementary packaging element, and inertness to medicinal fluids, which comprises about 1.5 to about 6% polytetrafluoroethylene and about 0.5 to about 2% poly n-butyl methacrylate in solvent comprising about 68 to about 92% 1,1,1-trichlorethane and about 6 to about 24% of 1,1,2-trichloro-2,2,1-trifluoroethane and having a specific gravity of about 1.2 to about 1.4.

2. A dried residue of the solution of claim 1, in the form of a film of said poly n-butyl methacrylate containing said polytetrafluoroethylene, deposited on an elastomer substrate.

* * * * *